(12) United States Patent
Freudenberg et al.

(10) Patent No.: US 8,076,815 B2
(45) Date of Patent: Dec. 13, 2011

(54) POLE TOOTH WITH END FACE LAMINATE FOR CONNECTION OF POLE TOOTH HALVES AND CORRESPONDING METHOD FOR PRODUCTION OF A POLE TOOTH

(75) Inventors: Mark Freudenberg, Unterschleissheim (DE); Markus Jakobi, Fürstenfeldbruck (DE); Josef Maidl, Wallerfing (DE); Michael Menhart, Igling (DE)

(73) Assignee: Siemens Aktiengesellschaft, München (DE)

( * ) Notice: Subject to any disclaimer, the term of this patent is extended or adjusted under 35 U.S.C. 154(b) by 184 days.

(21) Appl. No.: 12/294,773

(22) PCT Filed: Feb. 19, 2007

(86) PCT No.: PCT/EP2007/051540
§ 371 (c)(1),
(2), (4) Date: Sep. 26, 2008

(87) PCT Pub. No.: WO2007/110282
PCT Pub. Date: Oct. 4, 2007

(65) Prior Publication Data
US 2010/0237717 A1    Sep. 23, 2010

(30) Foreign Application Priority Data
Mar. 28, 2006   (DE) .......................... 10 2006 014 341

(51) Int. Cl.
*H02K 41/03* (2006.01)
*H02K 41/02* (2006.01)
*H02K 41/00* (2006.01)

(52) U.S. Cl. ................. 310/181; 310/12.01; 310/154.36; 310/154.37; 310/154.38; 310/154.39; 310/154.41; 310/216.079; 310/12.33

(58) Field of Classification Search ............ 310/154.36–154.41, 156.59–156.67, 216.079, 181, 12.01–12.33; H02K 1/00, 1/06, 23/04, 21/12
See application file for complete search history.

(56) References Cited

U.S. PATENT DOCUMENTS
2,812,460 A * 11/1957 Meyer .................... 310/216.079
(Continued)

FOREIGN PATENT DOCUMENTS
DE         697 03 136 T2      3/2001
(Continued)

OTHER PUBLICATIONS
Machine translation of JP10164820, Shikayama, Jun. 1998.*

*Primary Examiner* — Quyen Leung
*Assistant Examiner* — Terrance Kenerly
(74) *Attorney, Agent, or Firm* — Henry M. Feiereisen; Ursula B. Day

(57) ABSTRACT

Electrical machines having pole teeth which can be equipped with a permanent magnet are intended to be capable of being assembled more easily. Provision is made for this purpose for two pole tooth halves (1,2) to be provided for each pole tooth, each of which two pole tooth halves has two opposing end sides. At least one end-side plate (3), which connects in each case one end side of the two pole tooth halves (1,2) to one another, is used for forming a pocket (5) between the two pole tooth halves (1,2), into which pocket a permanent magnet can be inserted. A space for the permanent magnet can therefore be kept free during assembly of the pole tooth or during winding thereof. Since the permanent magnet only needs to be inserted into the pocket (5) relatively late, the entire assembly process can be simplified.

9 Claims, 5 Drawing Sheets

U.S. PATENT DOCUMENTS

| | | |
|---|---|---|
| 6,271,613 B1 | 8/2001 | Akemakou |
| 6,359,349 B1 * | 3/2002 | Sakamoto ................ 310/49.33 |
| 6,601,287 B2 * | 8/2003 | Pop, Sr. ........................ 29/596 |
| 6,784,586 B2 * | 8/2004 | Akemakou ................... 310/194 |
| 2002/0158537 A1 * | 10/2002 | Morita ......................... 310/181 |
| 2005/0082934 A1 * | 4/2005 | Kawai .......................... 310/181 |
| 2008/0185932 A1 * | 8/2008 | Jajtic et al. ................... 310/181 |
| 2009/0243415 A1 * | 10/2009 | Hoppe ...................... 310/154.11 |

FOREIGN PATENT DOCUMENTS

| | | |
|---|---|---|
| EP | 1 087 497 A2 | 3/2001 |
| JP | 2280655 A | 11/1990 |
| JP | 10164820 * | 6/1998 |
| JP | 2002199679 A | 7/2002 |
| WO | WO 2005/064767 A1 | 7/2005 |

* cited by examiner

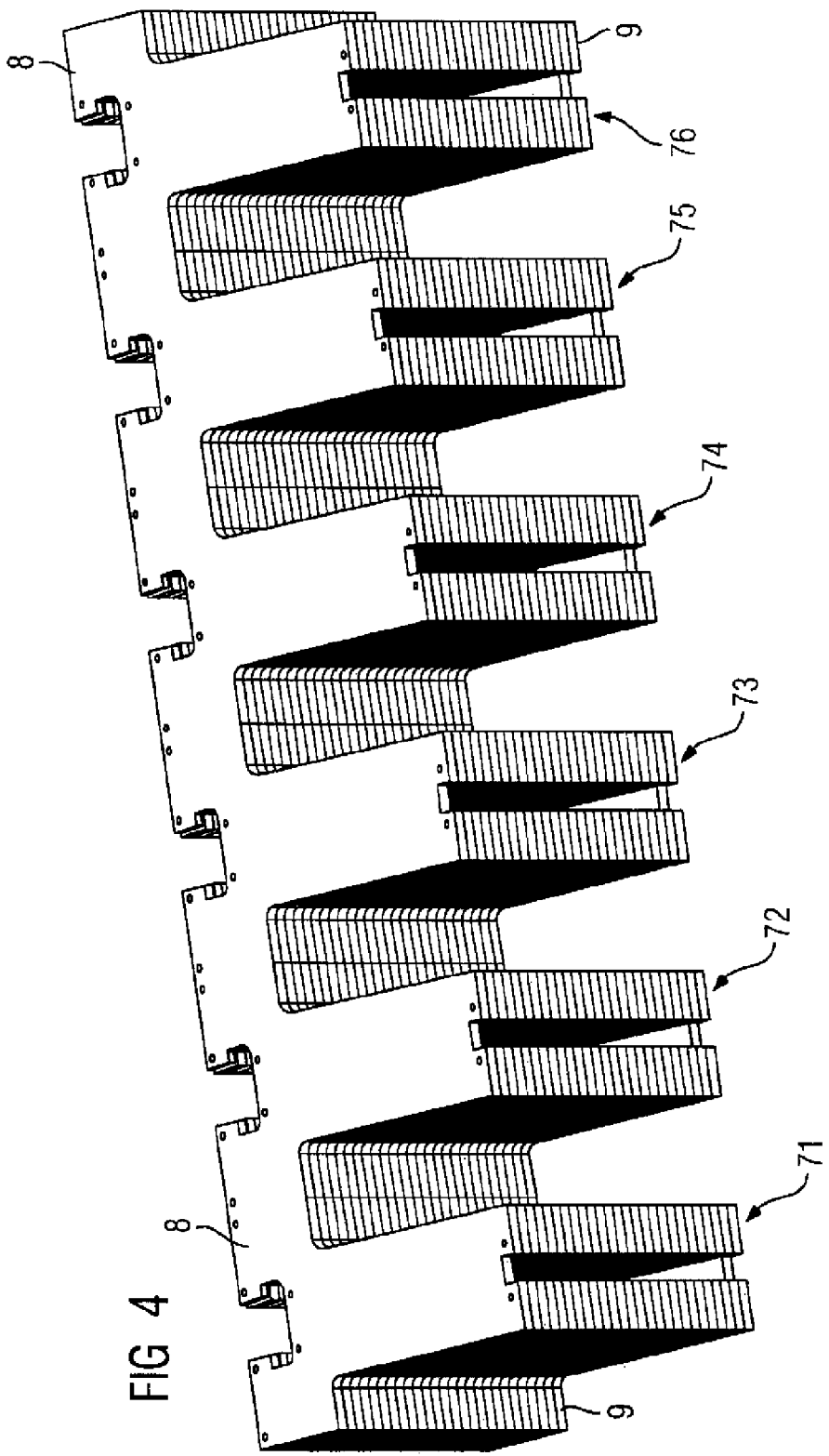

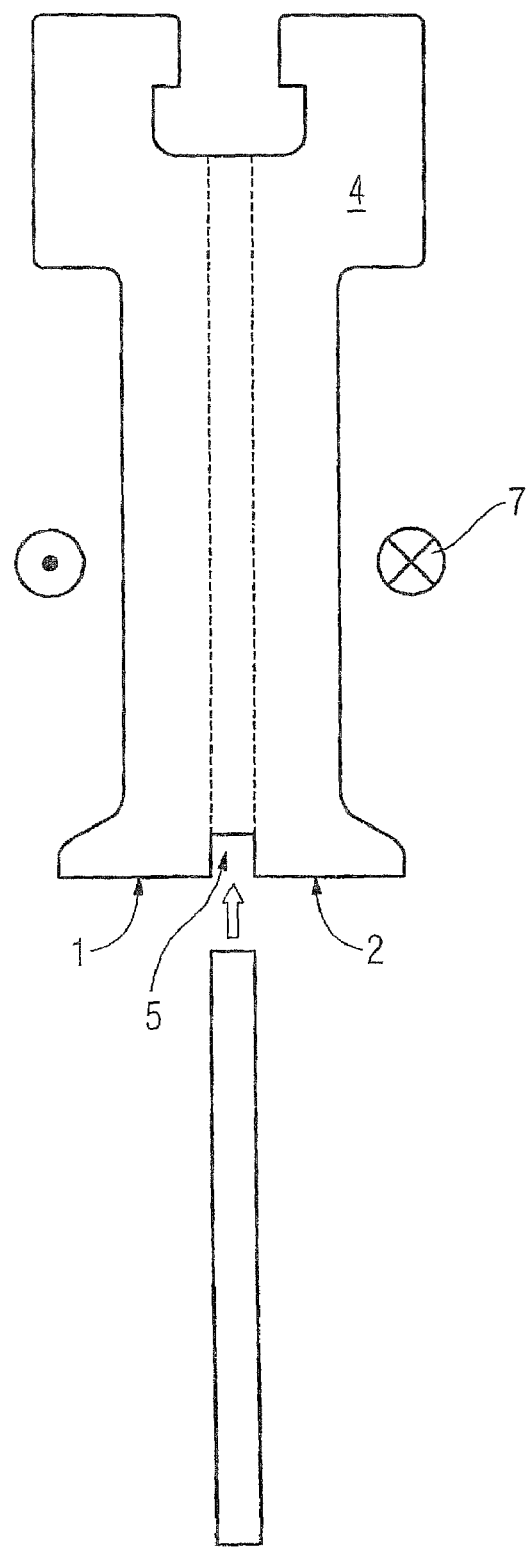

POLE TOOTH WITH END FACE LAMINATE FOR CONNECTION OF POLE TOOTH HALVES AND CORRESPONDING METHOD FOR PRODUCTION OF A POLE TOOTH

BACKGROUND OF THE INVENTION

The present invention relates to a pole tooth and to an electrical machine having a first active part which has at least one pole tooth which is fitted with a permanent magnet, and having a second active part which is magnetically operatively connected to the first active part for movement relative to one another. Furthermore, the present invention relates to a corresponding method for production of a pole tooth of an electrical machine. The expression "active part" in this case means, for example, a primary part or a secondary part of a linear motor, or else a stator or rotor of a torque motor. The problem and the solution of the present invention will be described here, however, primarily with reference to a linear motor.

Synchronous linear motors are known with magnets arranged in the air gap. Furthermore, synchronous linear motors have also been developed in which the magnets are embedded in the pole teeth of the primary part. In this case, retrospective magnetization of the magnet blanks is impossible. Ready-magnetized permanent magnets must therefore be used. In order to integrate these permanent magnets in the production process as late as possible, a modified motor laminate section is required. However, synchronous linear motors such as these with embedded permanent magnets have the disadvantage that the production process must be carried out with very great care and with a large amount of effort.

SUMMARY OF THE INVENTION

The object of the present invention is therefore to find a design of a pole tooth and a corresponding method of production of pole teeth, by means of which it is possible to integrate the permanent magnets in the production process as late as possible.

According to the invention, this object is achieved by a pole tooth for an electrical machine which can be fitted with a permanent magnet, having two pole tooth halves, each of which has two opposite end faces, at least one end face laminate which connects in each case one end face of the two pole tooth halves to one another, such that a pocket into which a permanent magnet can be inserted is formed between the two pole tooth halves.

The pole tooth halves are advantageously fixed with respect to one another by the end face laminate even before the insertion of a permanent magnet, such that they can be wound and fitted. If the permanent magnet is then inserted into the pocket at the end of the assembly process, the preceding assembly steps can be carried out more easily.

Each pole tooth half preferably comprises a laminated core. A core such as this can be produced with a desired height by conventional packing technology. If required, the end face laminate can also be packed with the two pole tooth halves.

The pole tooth or the pole tooth halves may have a disconnectable pole shoe in one specific embodiment. This makes it possible to push prefabricated coils onto the pole tooth, and the pole tooth need not be wound in the assembled state.

In one particularly preferred embodiment, a pole tooth module can be produced with a plurality of pole teeth, as described above, with each pole tooth or each pole tooth half comprising a laminated core. In this case, it is possible to arrange a plurality of pole teeth adjacent to one another in the packing direction, and to use a common end laminate in each case for two of the pole teeth. In this case, the pole tooth module in practice comprises a single overall pole tooth which is created by arranging a plurality of identical pole teeth in a row. By way of example, this allows the size of the overall pole tooth in the packing direction to be matched to the corresponding size of the primary part.

However, the pole tooth module can also comprise a plurality of pole teeth which are arranged transversely with respect to the packing direction, with the end laminates of the plurality of pole teeth being integrally connected to one another. By way of example, this allows the pole teeth to be connected to one another via a common end laminate over the entire length of a primary part of a linear motor.

According to the invention, the object mentioned above is also achieved by a method for production of a pole tooth of an electrical machine by provision of two pole tooth halves, each of which has two opposite end faces, connection of in each case one end face of the two pole tooth halves to an end face laminate, such that a pocket is formed between the two pole tooth halves, and insertion of a permanent magnet into the pocket.

In this case, as already mentioned above, it is preferable for the pole tooth to be provided with a winding before the insertion of the permanent magnet. This production step of fitting a winding to the pole tooth can therefore also be carried out without the permanent magnet being in the pole tooth.

BRIEF DESCRIPTION OF THE DRAWING

The present invention will now be explained in more detail with reference to the attached drawings, in which:

FIG. 4 shows a pole tooth module transversely with respect to the packing direction; and FIG. 5 shows a pole tooth module with winding.

DETAILED DESCRIPTION OF PREFERRED EMBODIMENTS

The exemplary embodiments which will be described in more detail in the following text represent preferred embodiments of the present invention.

Figure 1:
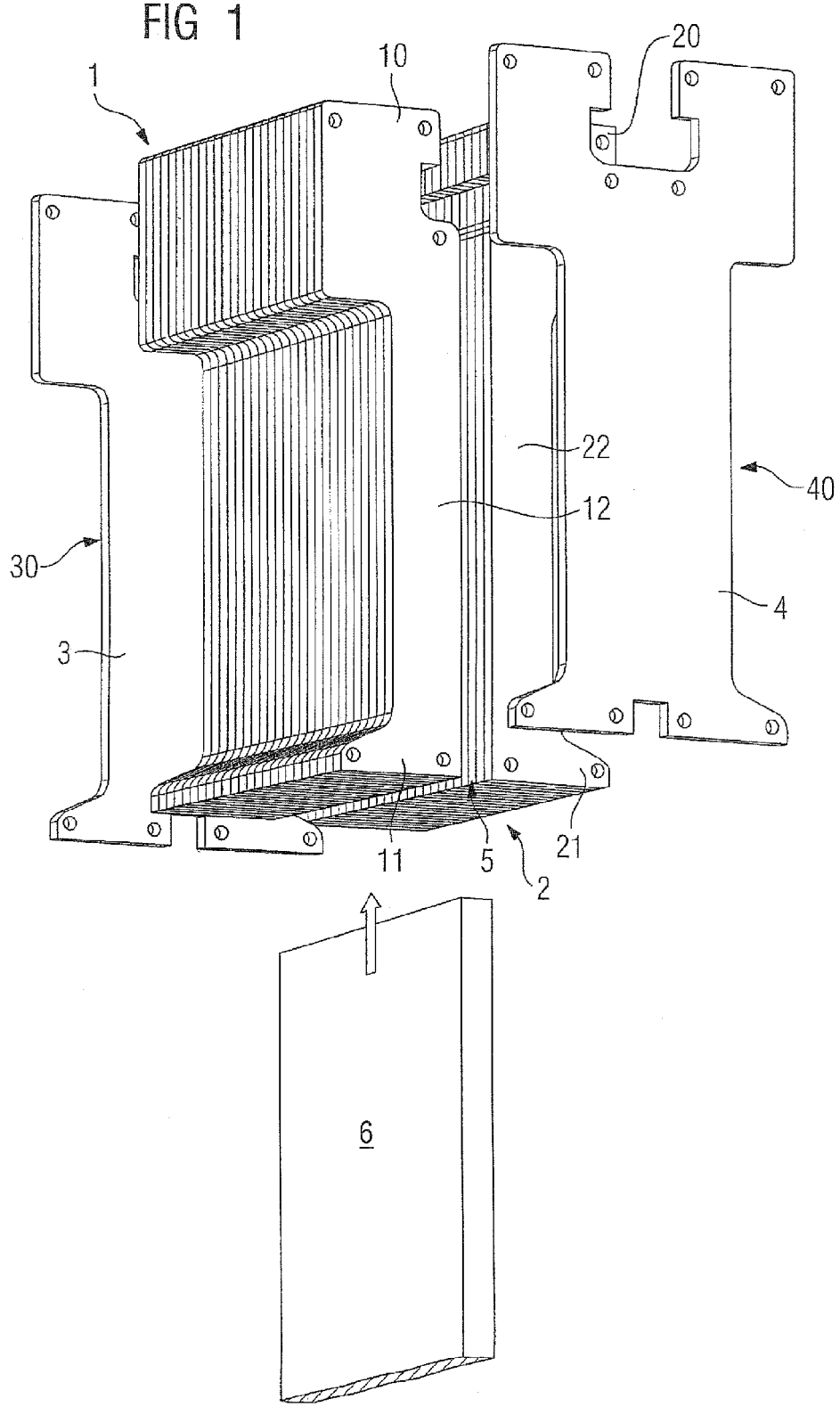
FIG. 1 shows an exploded view of a pole tooth according to the invention with end face laminates.

The pole tooth that is shown in the form of an exploded view in FIG. 1 comprises two packed pole tooth halves 1 and 2. Furthermore, an end laminate 3 and 4 is arranged on each of the two end faces.

The pole tooth halves 1, 2 have an essentially C-shaped structure, with one of their ends being formed by the pole tooth heads 10, 20 and with the other ends being formed by pole shoes 11, 21. The central areas 12, 22 of the pole tooth halves are essentially in the form of plates. The two pole tooth halves 1 and 2 are arranged such that a gap or pocket 5, into which a permanent magnet 6 can be inserted, is produced between them and their central areas 12, 22. Advantageously, the pole tooth can be provided with a winding 7 before the insertion of the permanent magnet 6, as shown in FIG. 5. This production step of fitting a winding 7 to the pole tooth can therefore also be carried out without the permanent magnet 6 being in the pole tooth.

Each of the end laminates 3, 4 has the contour of the end faces of the two pole tooth halves 1, 2 including the gap 5 located in between. Each end face laminate 3, 4 therefore has a waisted central area 30, 40.

Figure 2:
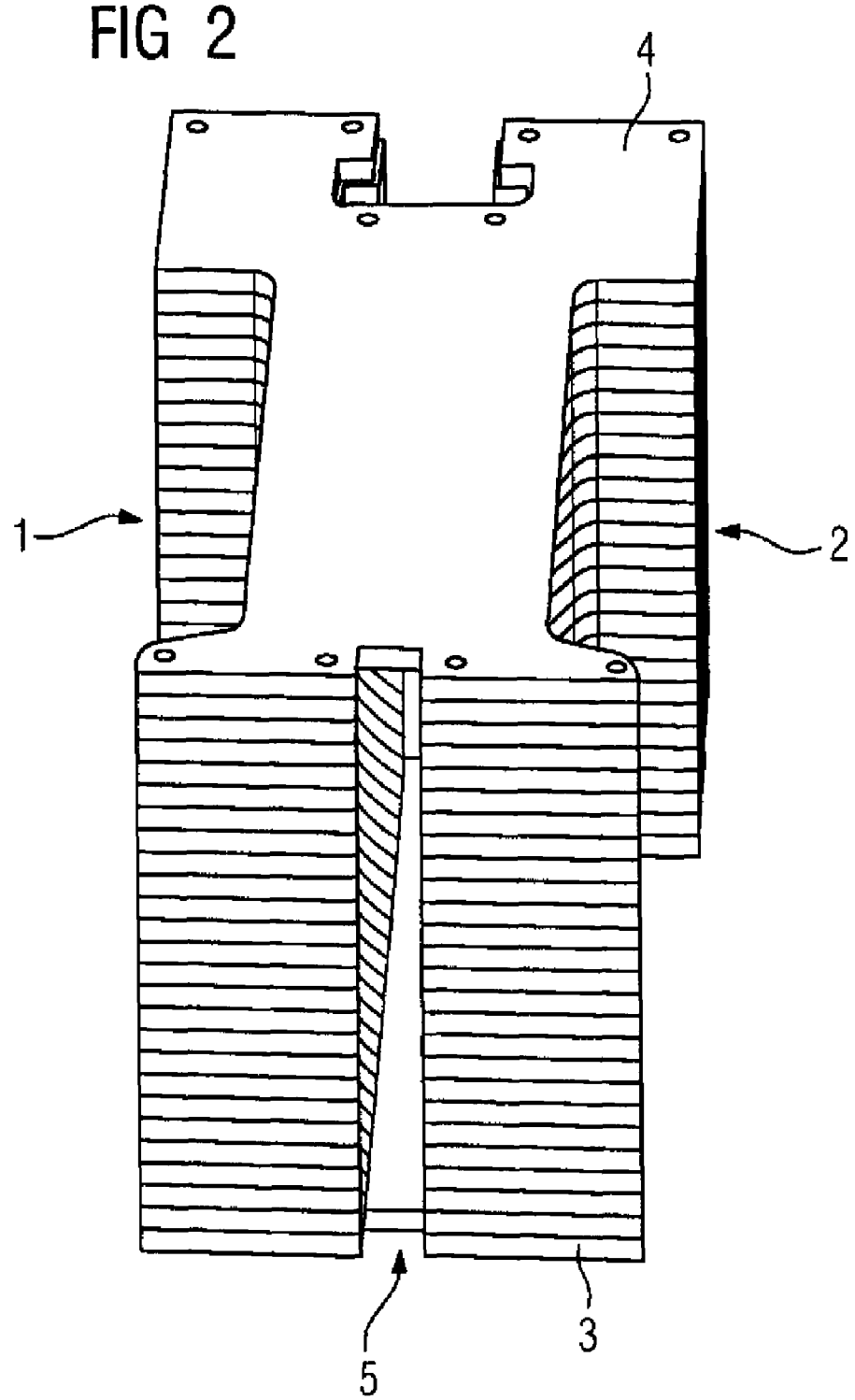
FIG. 2 shows the pole tooth from FIG. 1 in the assembled state.

FIG. 2 illustrates the pole tooth from FIG. 1 in the assembled state. The two end face laminates 3, 4 hold the two pole tooth halves 1, 2 at the desired distance apart, thus resulting in the pocket 5. The said elements 1 to 4 are connected to one another by stamp packing or some other packing technique (stove enamel, adhesive bonding, welding, clamping, riveting, etc.). In each case, this results in a dimensionally stable pocket 5 and the pole tooth can be wound without having to previously insert the permanent magnet 6 into the pocket 5. This is particularly advantageous not only for assembly of a primary part of a synchronous linear motor but also for the production of corresponding rotary drives.

Figure 3:
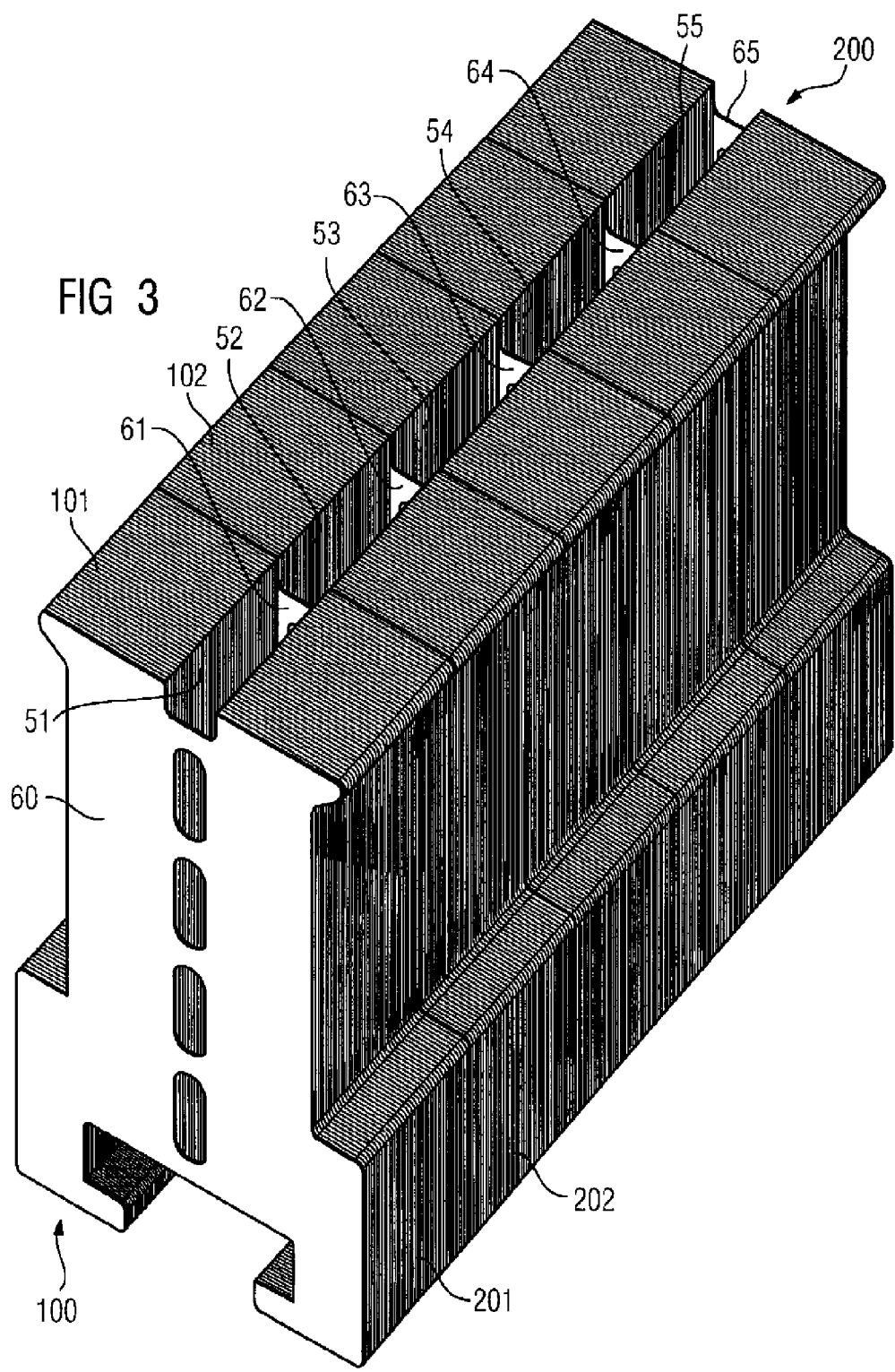
FIG. 3 shows a pole tooth module in the packing direction.

A further-developed embodiment of the present invention is illustrated in FIG. 3. This shows a laminated pole tooth whose pole tooth halves 100, 200 are held at the desired distance apart by a plurality of continuous laminates 60, 61, 62, 63, 64 and 65. This in each case results in a row of five pockets 51, 52, 53, 54 and 55, which are aligned with one another, and are in each case separated by the laminates 60 to 65. Permanent magnets of appropriate size can be inserted into these pockets 51 to 55.

The pole tooth illustrated in FIG. 3 can also be described as a pole tooth module in which a plurality of individual pole teeth as shown in FIG. 2 are arranged one behind the other in the packing direction. In this case, one end face laminate can in each case be used for two laminated cores, which are arranged in a row in the packing direction, as a spacer for the respective pole tooth halves. For example, the individual laminated cores 201 and 202, as well as 101 to 102 thus have the common end face laminate or separating laminate 61. This applies to the other individual laminated cores. Real end face laminates 60, 65 are fitted only to the free end faces of the pole tooth module and form the end faces of the complete pole tooth. This allows a single pole tooth module to be used for the entire width of a primary part.

A further embodiment of the present invention is illustrated in FIG. 4. This is a longitudinal module with six pole teeth. Thus, in this example, six pole teeth as shown in FIG. 2 are arranged and connected to one another in a direction transversely with respect to the packing direction. The individual pole teeth 71 to 77 are connected by two continuous end face laminates 8 and 9. These two end face laminates 8 and 9 are complete sections and not only keep the individual pole tooth halves of the pole teeth 71 to 76 at the desired distance apart, but also hold the pole teeth, which are arranged alongside one another, together at their pole tooth heads. Furthermore, the two end face laminates 8 and 9 bound the respective pockets, which are formed between the pole tooth halves, in the packing direction. This allows a pole tooth module to be produced with the desired length of the primary part. A module such as this can also be combined with the module illustrated in FIG. 3, for example by inserting a further integral laminate into the laminated core arrangement, parallel to the end face laminates 8 and 9.

As can also be seen from the illustration in FIG. 4, the individual pole teeth 71 to 76 do not have salient pole shoes. This has the advantage that prefabricated coils can be pushed onto the pole teeth, and if required specific pole shoes can be fitted to the ends of the laminated cores after fitting of the coils.

What is claimed is:

1. A pole tooth for an electrical machine, comprising:
   two pole tooth halves, each of which having two opposite end faces and defining a longitudinal axis;
   a laminate extending in parallel relationship to the longitudinal axis and connecting an end face of the two pole tooth halves to one another to thereby form a pocket in a direction of the longitudinal axis between the two pole tooth halves for insertion of a permanent magnet; and
   a winding wound about the two pole tooth halves and the laminate.

2. The pole tooth as claimed in claim 1, wherein each pole tooth half is configured in the form of a laminated core.

3. The pole tooth as claimed in claim 1, wherein each pole tooth half has a disconnectable pole shoe.

4. The pole tooth as claimed in claim 1, wherein the laminate has an outer contour complementing an outer contour of an end face of the pole tooth.

5. A pole tooth module, comprising a plurality of pole teeth, each pole tooth including two pole tooth halves, each of which having two opposite end faces and defining a longitudinal axis, a laminate extending in parallel relationship to the longitudinal axis and connecting an end face of the two pole tooth halves to one another to thereby form a pocket in a direction of the longitudinal axis between the two pole tooth halves for insertion of a permanent magnet, wherein each pole tooth is configured in the form of a laminated core, and a winding wound about the two pole tooth halves and the laminate.

6. The pole tooth module as claimed in claim 5, wherein the laminate has an outer contour complementing an outer contour of an end face of the pole tooth.

7. The pole tooth module as claimed in claim 5, wherein a plurality of pole teeth are arranged adjacent to one another in a packing direction, with neighboring pole teeth being separated from one another by a single end laminate.

8. The pole tooth module as claimed in claim 5, wherein a plurality of pole teeth are arranged transversely in relation to a packing direction, and further comprising end laminates respectively placed upon the end faces of the pole tooth halves, wherein the end laminates on each of the end faces of the pole tooth halves are connected to one another to form a single-piece construction.

9. A method for production of a pole tooth of an electrical machine, comprising the steps of:
   providing two pole tooth halves, each of which having two opposite end faces and defining a longitudinal axis;
   connecting each end face of the two pole tooth halves with a laminate extending in parallel relationship to the longitudinal axis to thereby form a pocket in a direction of the longitudinal axis between the two pole tooth halves;
   providing a winding about the pole tooth halves and the laminate; and
   inserting a permanent magnet into the pocket.

* * * * *